United States Patent
Ohishi et al.

(10) Patent No.: US 6,803,593 B2
(45) Date of Patent: Oct. 12, 2004

(54) DISTANCE MEASURING SYSTEM

(75) Inventors: Masahiro Ohishi, Tokyo-to (JP);
Mitsuru Kanokogi, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 91 days.

(21) Appl. No.: 09/558,562

(22) Filed: Apr. 26, 2000

(65) Prior Publication Data
US 2002/0185618 A1 Dec. 12, 2002

(30) Foreign Application Priority Data

May 14, 1999 (JP) .......................................... 11-134483

(51) Int. Cl.⁷ .............................................. G01N 21/86
(52) U.S. Cl. .................. 250/559.29; 356/4.07
(58) Field of Search ................. 250/559.29, 559.38, 250/559.39, 559.4, 206.1, 559; 356/4.07

(56) References Cited

U.S. PATENT DOCUMENTS

| | | | | |
|---|---|---|---|---|
| 4,646,092 A | * | 2/1987 | Schreuder | .................. 342/125 |
| 4,922,281 A | * | 5/1990 | Kitajima | ..................... 396/121 |
| 5,225,810 A | * | 7/1993 | Inoue et al. | ................. 340/577 |
| 5,241,360 A | * | 8/1993 | Key et al. | ................... 356/5.12 |
| 5,760,905 A | * | 6/1998 | Sasagawa | .................... 356/614 |
| 5,909,311 A | * | 6/1999 | Ohtomo et al. | ............. 359/494 |

* cited by examiner

Primary Examiner—Robert H. Kim
Assistant Examiner—Courtney Thomas
(74) Attorney, Agent, or Firm—Nields & Lemack

(57) ABSTRACT

A distance measuring system, which comprises a control arithmetic unit 1, a light emitting unit 2 for emitting a measuring light beam and a photodetection unit 3 for receiving a reflection light beam from an object to be measured, the system being used for measuring a distance by receiving the reflection light beam from the object to be measured, wherein the control arithmetic unit compares a signal based on the photodetection amount of the reflection light from the object to be measured as well as a result of the distance measurement with reference data prestored in the control arithmetic unit relating to the reflection of the object to be measured, and judges whether the object to be measured is a prism or a natural object based on a result of the comparison.

7 Claims, 3 Drawing Sheets

DISTANCE MEASURING SYSTEM

BACKGROUND OF THE INVENTION

The present invention relates to a distance measuring system for measuring a distance to an object to be measured by projecting a distance measuring light beam toward the object and by receiving the reflection light beam from the object, and in particular, to a distance measuring system for measuring a distance by receiving the light beam reflected from a surface of an object to be measured or by installing a prism on the object to be measured and by receiving the reflection light beam reflected from the prism.

In recent years, a new type of a distance measuring system has appeared, by which a distance to an object to be measured can be determined without using a prism for reflecting a distance measuring light beam. This new type of the distance measuring system measures the distance by receiving the weak reflection light beam reflected from the surface of the object to be measured itself or by emitting a pulsed light beam with high peak power and by receiving the reflection light beam reflected from the surface of the object to be measured itself.

Also, a type of a distance measuring system has appeared recently, which can measure a distance in a prism measurement mode using a prism and also in a non-prism measurement mode without using a prism. In this measuring system, both the prism measurement mode and the non-prism measurement mode can be selected depending on each application or situation. Because the measurement mode can be selected, there is no need to provide a light wave range-finder in the prism measurement mode and a laser range-finder in the non-prism measurement mode, and this is very convenient and advantageous for the user. When the measuring position should be clearly defined and the measurement should be performed with high accuracy in the distance measuring system, which has functions to measure the distance in both of the two measurement modes, i.e. the prism measurement mode and the non-prism measurement mode, the distance is measured using the prism. If it is difficult to install the prism on the object to be measured, and if the measurement may not be so accurate as in the measurement using the prism and the approximate distance would be measured, the distance is measured without using the prism.

In a conventional type of a distance measuring system with a non-prism measuring function, the distance is measured by receiving the reflection light beam from the object to be measured with a very small reflection light amount. For this reason, it is designed in such manner that photodetection sensitivity is set to a higher value or an exit light amount of the distance measuring light is set to a higher value. In this respect, even when the prism is not correctly collimated in the prism measurement mode, the measurement may be performed using reflection light beam from the surface of an object other than the prism, e.g. a natural object. In this case, the incorrectly measured distance value may be displayed on a display unit of the distance measuring system.

In particular, when the user measures the distance using the prism, the distance must be measured with high accuracy as described above. If the distance is measured even though the prism is not correctly collimated, the user may acquire an incorrect distance value without becoming aware of incorrectness of the data. In addition, when there is an obstacle before the prism and a part of the distance measuring light beams hits the obstacle, the user may measure the distance to the obstacle without being aware that it is not the object to be measured. Furthermore, even when the user becomes aware, it is difficult to judge which is correctly measured, the obstacle or the object to be measured.

These problems did not occur in case of the conventional type of a light wave range-finder, which can measure the distance only in the prism measurement mode. That is, in case of the conventional type of the light wave range-finder, the distance cannot be measured unless the sufficient light amount is reflected as the reflection light beam from the prism. If the distance is not measured in the conventional type of the system, it means that the prism is not correctly collimated. Thus, incorrect measurement of an object other than the prism did not occur in the conventional type of the system.

SUMMARY OF THE INVENTION

It is an object of the present invention to provide a distance measuring system, by which a type of an object to be measured is judged from a photodetection amount of a light beam reflected from the object to be measured and from a measured distance value, and it is possible to eliminate incorrect measurement in case of prism measurement.

To attain the above object, the distance measuring system according to the present invention comprises a control arithmetic unit, a light emitting unit for emitting a measuring light beam and a photodetection unit for receiving a reflection light beam from an object to be measured, and the system being used for measuring a distance by receiving the reflection light beam from the object to be measured, wherein the control arithmetic unit compares a signal based on photodetection amount of the light from the object to be measured as well as a result of distance measurement with a reference data prestored in the control arithmetic unit relating to reflection of the object to be measured, and judges the object to be measured based on a result of the comparison. Also, the present invention provides the distance measuring system as described above, further comprising a density filter for adjusting the photodetection amount of the light beam from the object to be measured, wherein the signal based on the photodetection amount represents a density position of the density filter, and the reference data relating to reflection of the object to be measured is obtained by associating a measured distance with the density position of the density filter. Further, the present invention provides the distance measuring system as described above, wherein the density filter is a disk where density is continuously changed in a circumferential direction, the density filter is rotated by a stepping motor, and the density position corresponds to a number of rotating steps of the stepping motor. Also, the present invention provides the distance measuring system as described above, wherein the reference data relating to the reflection of the object to be measured contains change of the photodetection amount due to weather conditions as a tolerance value. Further, the present invention provides the distance measuring system as described above, further comprising a display unit, wherein a result of judgment on the object to be measured is displayed on the display unit. Also, the present invention provides the distance measuring system as described above, wherein there are provided at least a prism measurement mode and a non-prism measurement mode, and when the prism mode is selected, the distance is displayed on the display unit only when the object to be measured is judged as a corner cube, and the fact that the object to be measured is not a corner cube is displayed on the display unit when the object to be measured is not judged as a corner cube. Further, the present invention provides the distance measuring system as described above, wherein photodetection sensitivity can be automatically changed over according to the photodetection amount of the light beam from the object to be measured, the object to be measured is judged according to the photodetection amount, and a result of judgment on the object to be measured is displayed on the display unit.

DETAILED DESCRIPTION OF THE PREFERRED EMBODIMENT

Figure 1:
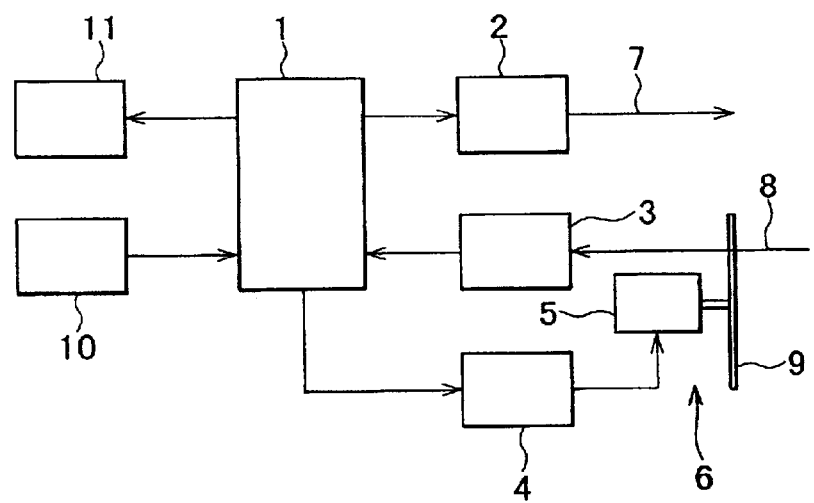
FIG. 1 is a schematical block diagram of an embodiment of the present invention.

Description will be given below on an embodiment of the present invention referring to the drawings.

FIG. 1 is a block diagram to show a general arrangement of a distance measuring unit of a first embodiment of the present invention.

A control arithmetic unit 1 issues a light emission control signal to a light emitting unit 2, and the light emitting unit 2 emits a distance measuring light beam 7 to an object to be measured (not shown) positioned outside the system. The distance measuring light beam 7 reflected from the object to be measured is received by a photodetection unit 3 via a beam attenuation unit 6 as a receiving light beam 8. The photodetection unit 3 converts the receiving light 8 to an electric signal. The converted electric signal is inputted to the control arithmetic unit 1 as a photodetection signal, and the control arithmetic unit 1 calculates a measured distance value according to the photodetection signal 1.

The beam attenuation unit 6 comprises a motor driving unit 4, a motor 5, a density filter 9, etc. The motor driving unit 4 receives a photodetection amount adjusting signal from the control arithmetic unit 1. Based on the photodetection amount adjusting signal, the motor 5 is rotated at a rotation angle, which corresponds to the photodetection amount adjusting signal. The density filter 9 is mounted on the rotation shaft of the motor 5 and it is designed to cut off or shield the receiving light 8.

Figure 2:
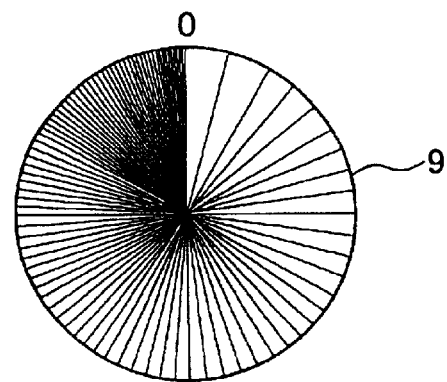
FIG. 2 is a drawing to explain a density filter to be used in the embodiment.

On the density filter 9, a zero position is determined as shown in FIG. 2, and the density becomes continuously denser as it goes away from the zero position. The density of a group of diameters shown in FIG. 2 indicates density of the density filter 9. To adjust the photodetection amount, the control arithmetic unit 1 drives the motor 5 via the motor driving unit 4 while checking the magnitude of the photodetection signal from the photodetection unit 3, and rotates the density filter 9. Then, it controls transmitting position of the receiving light 8. A stepping motor is used as the motor 5, and the attenuation amount of the receiving light 8 can be read from a number of steps from the position (zero position in FIG. 2) of transmissivity 1 (without light attenuation amount) of the density filter 9.

The control arithmetic unit 1 comprises an operation unit 10 and a display unit 11. The operation unit 10 has a data input key (not shown) for inputting data relating to survey operation and a mode changing switch (not shown) for switching over to a survey mode using a prism (prism mode) and a survey mode not using a prism (non-prism mode). On the display unit 11, a measured distance value, a selected mode, a distance measuring status, etc. are displayed.

When it is supposed that light emitting intensity of the distance measuring light beam 7 emitted from the light emitting unit 2 is constant, light amount of the received light beam 8 is changed according to reflectivity of the object to be measured and also to a distance from the distance measuring system to the object to be measured. For this reason, when the reflectivity of the reflection surface of the object to be measured is high or when the distance from the distance measuring system to the object to be measured is small, the light amount of the receiving light beam 8 increases too much. In this respect, before the receiving light beam 8 enters the photodetection unit 3, it is attenuated by the beam attenuation unit 6 so that the light amount is decreased to such an adequate value that the photodetection unit 3 can receive the light beam.

The receiving light beam 8 changes according to the reflectivity of the object to be measured and also to the distance from the distance measuring system to the object to be measured. It is known that, in case of a corner cube commonly used in survey operation, it can be calculated by the following equation:

$$P = (P_0 \cdot S_{ob} \cdot e^{-2\beta \times L})/(4\pi L^2 \cdot \tan^2 \alpha) \tag{1}$$

where

P: Light signal detecting ability (nW)

$P_o$: Output of objective lens (nW)

$S_{ob}$: Area of photodetecting objective lens ($\times 10^{-10}$ cm$^2$)

$\beta_x$: Attenuation rate in atmospheric air between two points

L: Measured distance (km)

α: Beam spreading angle

Figure 3:
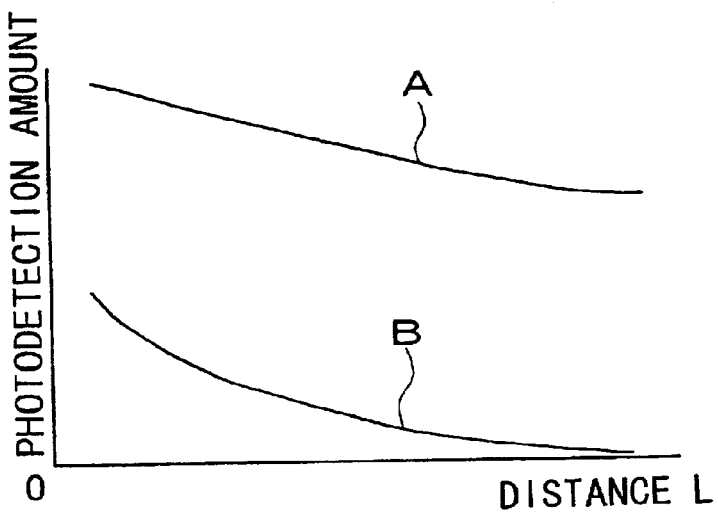
FIG. 3 is a diagram showing a difference of a light amount between a light beam received from a prism and a light beam received from a natural object.

On the other hand, in the non-prism survey mode, the distance measuring system receives diffusion light from the surface of the object to be measured and measures the distance, but light amount of the diffusion light which can be received by the distance measuring system is extremely smaller compared with the reflection light beam from the prism. FIG. 3 shows comparison between the diffusion light from the surface of the object to be measured and the reflection light beam from the prism. FIG. 3 is a conceptual representation of the photodetection amount of reflection light beam from a corner cube used in the prism measurement mode and from the object to be measured (natural object) in the non-prism measurement mode. When photodetection sensitivity is changed, a similar trend is found in the photodetection amount in the prism measurement mode and the non-prism measurement mode. In FIG. 3, the curve A represents the photodetection amount of the reflection light beam from the corner cube and the curve B shows the photodetection amount of the reflection light from the natural object.

Figure 4:
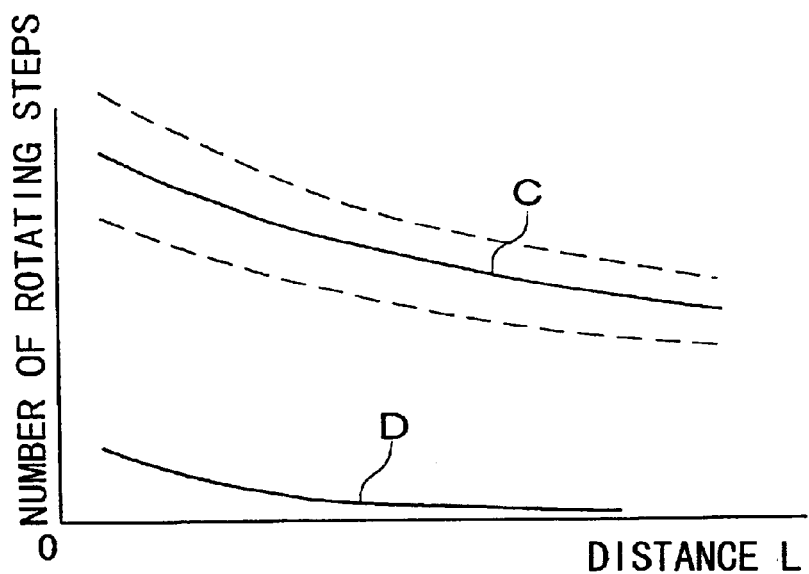
FIG. 4 is a diagram when the light amount of the receiving light beam is converted to a transmitting position of the receiving light beam on a density filter.

As described above, the photodetection amount can be expressed by the number of rotating steps of the density filter 9 of the beam attenuation unit 6. The receiving light beam 8 according to the equation (1) is depends on weather conditions, or dusty conditions at the measuring site, etc., and the approximate range of changes can be defined as tolerances. Even if this approximate range of changes is taken into account, there is an extensive difference in the photodetection amount between in the prism measurement mode and in the non-prism measurement mode. FIG. 3 can be re-drawn as shown in FIG. 4 by taking these facts into consideration. As it is sufficiently evident in FIG. 4, Adz from the measured distance to the object to be measured and, when the photodetection amount is turned to an adequate light amount by the density filter 9, from the density of the density filter 9, i.e. from the number of rotation steps, the control arithmetic unit 1 can determine whether the object is a corner cube or it is a natural object. The relation between the measured distance L and the number of the rotation steps of the density filter 9 as shown in FIG. 4 is set in a storage unit (not shown) of the control arithmetic unit 1 in advance. In FIG. 4, the curve C represents the number of the rotation steps of the density filter 9 with respect to the reflection light beam from the corner cube, and broken lines above and below of the curve C represent the tolerance. The curve D indicates the number of the rotation steps of the density filter 9 with respect to the reflection light from a natural object.

The control arithmetic unit 1 drives the motor 5 via the motor driving unit 4 based on the photodetection signal from the photodetection unit 3 so that the photodetection amount at the photodetection unit 3 will be an adequate value, and it rotates the density filter 9. Further, when the photodetection amount is turned to an adequate value, driving pulses from the motor driving unit 4 are counted. The number of the driving pulses correspond to the number of the rotation steps of the density filter 9 and also correspond to the rotating position (density) of the density filter 9. The photodetection amount is then adjusted, and the control arithmetic unit 1 measures the distance to the object to be measured according to the photodetection signal from the photodetection unit 3. The control arithmetic unit 1 determines whether the object to be measured is a corner cube or other natural object according to the results of the distance measurement, the number of driving pulses and the data of FIG. 4. The results of this judgment is displayed on the display unit 11 together with the results of the distance measurement. Alternatively, the control arithmetic unit 1 may determine whether the object to be measured is a corner cube or a natural object according to the data obtained by the photodetection amount before the light amount adjustment (the photodetection amount at the density filter 9 when light is not attenuated) and by the measurement distance instead of the number of driving pulses.

[Concrete Embodiment 1]

In case the display unit 11 is provided with a changeover switch to select the prism mode and the prism mode is selected, the control arithmetic unit 1 can determine whether the object to be measured is a corner cube or a natural object according to the measured distance and the number of the steps of the beam attenuation unit 6 at that moment. Only when the object to be measured is judged as a corner cube, the display unit 1 displays the measured distance. In case the object to be measured is a natural object (i.e. an object other than corner cube), the display unit 11 does not display the measured distance or display a message of a warning that the corner cube is not measured or collimation is not accurately performed.

[Concrete Embodiment 2]

According to the photodetection amount, the control arithmetic unit 1 automatically changes over the photodetection sensitivity, and the fine light amount adjustment is performed at the density filter 9. According to the photodetection amount, it is judged whether the object to be measured is a natural object or a corner cube, and the result of the judgment is displayed on the display unit 11. The user judges the measurement status according to the display.

According to the equation (1) given above, the calculated photodetection amount is changed depending upon various conditions as described above. In order to increase the accuracy to judge whether it is a corner cube or a natural object, the user can input parameters of the distance measuring condition (such as a number or diameters of corner cubes, weather conditions, i.e. a range of visibility, etc.) to the control arithmetic unit 1 by the operation unit 10.

It is desirable that reference values of the light amount and the number of steps as the source for judgment and the correcting calculation procedure to correct the photodetection amount according to the inputted data are stored in a storage unit in the distance measuring system main unit, e.g. in the control arithmetic unit 1.

Figure 5:
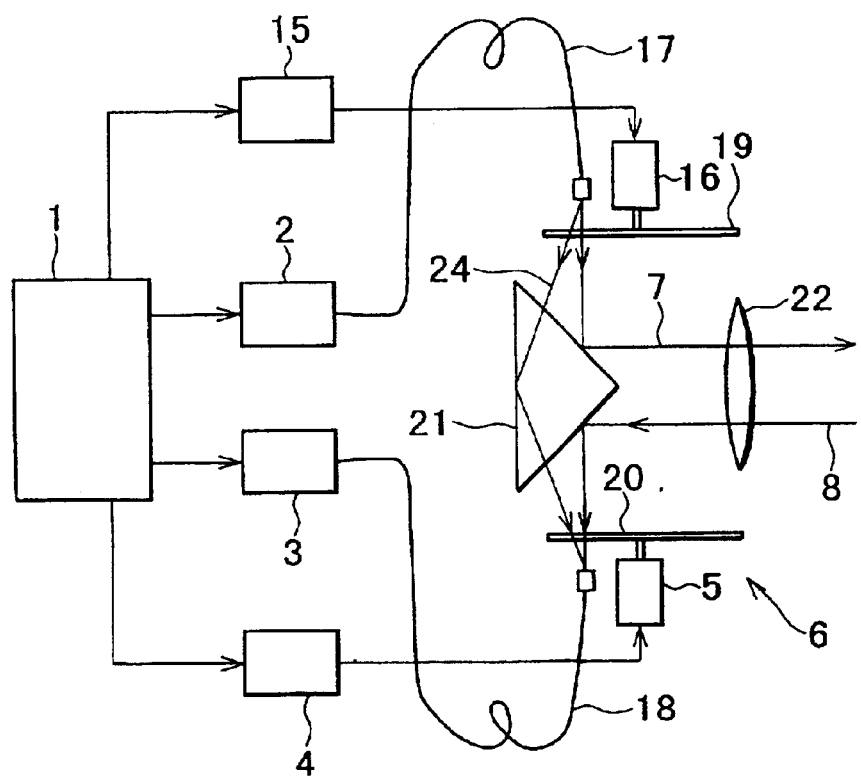
FIG. 5 is a block diagram of an example of an optical system of the embodiment of the present invention.

FIG. 5 is a block diagram which more concretely shows the optical system of the present embodiment. In FIG. 5, the same components as shown in FIG. 1 are referred by the same symbols, and detailed description is not given here. The operation unit 10 and the display unit 11 are not shown in this figure.

The measuring light beam 7 and the receiving light beam 8 exit or enter the distance measuring system via an objective lens 22, and a triangular mirror 21 is arranged on the optical axis of the objective lens 22. The measuring light beam 7 emitted from the light emitting unit 2 is guided by an optical fiber 17 for exit light, and the light exit end of the optical fiber 17 for exit light is arranged at a position opposite to the triangular mirror 21. An optical fiber 18 for photodetection having a photodetection end at a position opposite to the light exit end of the optical fiber 17 for exit light is designed in such manner as to guide the receiving light beam 8 toward the photodetection unit 3.

A chopper 19 for changing optical path is disposed between the light exit end of the optical fiber 17 for exit light and the triangular mirror 21, and the chopper 19 for changing optical path is rotated by a chopper motor 16 for optical path change. The chopper motor 16 is driven by a chopper motor driving unit 15, and the chopper motor driving unit 15 controls the rotation of the chopper motor 16 based on a control signal from the control arithmetic unit 1. A density filter 20 is disposed between the triangular mirror 21 and the photodetection end of the optical fiber 18 for photodetection, and the density filter 20 is rotated by the motor 5.

Figure 6:
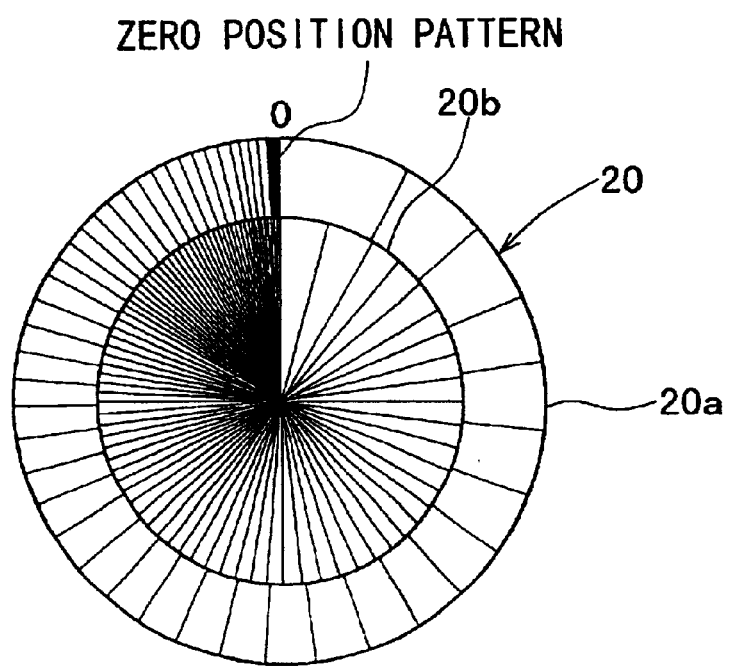
FIG. 6 is a drawing to explain a density filter to be used in the optical system.

FIG. 6 shows the density filter 20, which has a reference light attenuation area 20a in the outer peripheral portion and a receiving light attenuation area 20b at the central portion. The reference light attenuation area 20a is continuously designed so that the light amount is attenuated to $1/10$ when rotated by one turn, and it has a pattern showing the zero position. On the receiving light attenuation area 20b, the density is changed continuously so that the light amount is attenuated to $1/10^5$ when it is rotated by one turn.

When the chopper motor 16 is rotated, the optical path of the light beam emitted from the light emitting unit 2 is changed to the measuring light beam 7 or to a reference light beam 24. The measuring light beam 7 is reflected by the outer reflection surface of the triangular mirror 21 and it is projected toward the object to be measured (not shown) via the objective lens 22. The receiving light beam 8 reflected from the object to be measured is reflected by the other outer reflection surface of the triangular mirror 21. Then, it passes through the reference light attenuation area 20a of the density filter 20 and enters the optical fiber 18 for photodetection and is further guided toward the photodetection unit 3.

The reference light 24 is reflected by an inner reflection surface of the triangular mirror 21. Then, it passes through the receiving light attenuation area 20b of the density filter 20, enters the optical fiber 18 for photodetection and is guided toward the photodetection unit 3.

When the chopper 19 for changing optical path is rotated by the chopper motor 16, the light beam is changed over to the measuring light beam 7 or to the reference light beam 24. The control arithmetic unit 1 is composed in such manner that it calculates the distance to the object to be measured by subtracting the measured distance value when the reference light beam 24 (for error correction) is selected from the measured distance value when the measuring light beam 7 is selected.

When the reference light beam 24 is selected by the chopper 19 for changing optical path at the start of the operation and the density filter 20 is rotated by the motor 5 and zero position pattern is detected where the transmitted light amount is turned to a discontinuous value, the control arithmetic unit 1 can detect the zero position of the beam attenuation unit 6. After the zero position has been detected, the measuring light beam 7 is selected by the chopper 19 for changing optical path. Then, the control arithmetic unit 1 rotates the motor 5 so that the photodetection amount of the receiving light beam 8 reflected from the object to be measured is turned to an adequate value, and the object to be measured is determined as described above. Specifically, a rotation angle of the density filter 20 is determined, i.e. the number of the driving steps of the motor 5 based on signal from the photodetection unit 3 is counted. Based on the number of the driving steps thus counted, on the result of the distance measurement and on the reference data relating to the reflection of the object to be measured as shown in FIG. 4, the control arithmetic unit 1 judges whether the object to be measured is a prism (a corner cube) or other natural object. It may be designed in such manner that a photoelectric conversion detector is disposed on the circumference of the density filter 20 and the rotating position of the density filter 20 may be calculated. In the above, the density filter 20 is designed in circular shape, while it may be designed in an oblong shape and may be used by sliding.

According to the present invention, it is possible to determine whether the object to be measured is a corner cube or a natural object from the relation between the measured distance value and the photodetection amount, and this eliminates the possibility that the user may not perform correct collimation when the corner cube measurement is selected and may erroneously measure the distance based on the reflection light beam from the object other than the prism. Therefore, according to the present invention, the measurement can be performed with high reliability.

What is claimed is:

1. A distance measuring system for measuring distance by receiving a reflection light beam from an object to be measured, comprising a control arithmetric unit, a storage unit, a light emitting unit for emitting a measuring light beam, a photodetection unit for receiving said reflection light beam from said object to be measured and for issuing a signal based on a photodetection amount of said reflection light beam, a light amount adjuster for adjusting an amount of light entering said photodetection unit, a mode changing switch, and a display unit for displaying the result of a calculation of said arithmetic unit, wherein said mode changing switch selects whether said object to be measured is a prism or a natural object, said storage unit prestores a photodetection amount of a reflection light beam from the prism according to the distance and a photodetection amount of a reflection light beam from the natural object according to the distance, said light amount adjuster adjusts the photodetection amount of said reflection light beam received by said photodetection unit at an approximately constant amount and obtains an amount of the reflection light beam based on the result of the adjustment, said control arithmetic unit compares the obtained amount of the reflection light beans and the photodetection amount of said reflection light beam from said prism or said natural object that is prestored in said storage unit, and judges whether said object to be measured is the selected object to be measured based on the result of the comparison, and said display unit displays the result of said judgment by said control arithmetic unit.

2. A distance measuring system according to claim 1, wherein said light amount adjuster comprises a density filter for adjusting said photodetection amount of said reflection light beam from said object to be measured, said storage unit prestores an adjusting position of said density filter according to the distance to the prism and to the natural object, and said object to be measured is judged based on the adjusting position of said density filter.

3. A distance measuring system according to claim 1, wherein data is obtained by associating the photodetection amount of said photodetection emit before the light amount adjustment with the measurement distance, and the data is stored as reference data for judging said object to be measured.

4. A distance measuring system according to claim 1, wherein said mode changing switch selects a prism mode for using said prism as said object to be measured and a non-prism mode for using said natural object as said object to be measured based on the result of judgment of said display unit.

5. A distance measuring system according to claim 3, wherein said reference data relating to the reflection of said object to be measured contains change of said photodetection amount due to weather conditions as a tolerance value.

6. A distance measuring system according to claim 4, wherein there are provided at least a prism measurement mode and a non-prism measurement mode, and when said prism mode is selected, said distance is displayed on said display unit only when said object to be measured is judged as a prism, and a warning that collimation in not performed is displayed on said display unit when said object to be measured is not judged as a prism.

7. A distance measuring system according to claim 4, wherein photodetection sensitivity can be automatically changed over according to said photodetection amount of said reflection light beam from said object to be measured, the light amount is adjusted by the light amount adjuster, it is judged whether said object to be measured is she selected object to be measured according to said photodetection amount, and the result of she judgment is displayed on said display unit.

* * * * *

UNITED STATES PATENT AND TRADEMARK OFFICE
CERTIFICATE OF CORRECTION

PATENT NO. : 6,803,593 B2
DATED : October 12, 2004
INVENTOR(S) : Ohishi et al.

It is certified that error appears in the above-identified patent and that said Letters Patent is hereby corrected as shown below:

<u>Title page,</u>
Item [*] Notice, "Subject to any disclaimer, the term of this patent is extended or adjusted under 35 U.S.C. 154(b) by 91 days." should read
-- Subject to any disclaimer, the term of this patent is extended or adjusted under 35 U.S.C. 154(b) by 0 days. --.

Signed and Sealed this

Eleventh Day of October, 2005

JON W. DUDAS
*Director of the United States Patent and Trademark Office*